United States Patent
Kannappa

(10) Patent No.: US 10,818,173 B2
(45) Date of Patent: Oct. 27, 2020

(54) INFORMATION SHARING AND USER EXPERIENCE ENHANCEMENT BY CONTEXT-AWARE VEHICLES

(71) Applicant: Ford Global Technologies, LLC, Dearborn, MI (US)

(72) Inventor: Meiyappan Kannappa, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/315,190

(22) PCT Filed: Jul. 6, 2016

(86) PCT No.: PCT/US2016/041133
§ 371 (c)(1),
(2) Date: Jan. 4, 2019

(87) PCT Pub. No.: WO2018/009186
PCT Pub. Date: Jan. 11, 2018

(65) Prior Publication Data
US 2019/0228652 A1  Jul. 25, 2019

(51) Int. Cl.
*G08G 1/0965* (2006.01)
*G08G 1/01* (2006.01)

(52) U.S. Cl.
CPC ......... *G08G 1/0965* (2013.01); *G08G 1/0112* (2013.01); *G08G 1/0125* (2013.01); *G08G 1/0133* (2013.01); *G08G 1/0141* (2013.01)

(58) Field of Classification Search
None
See application file for complete search history.

(56) References Cited

U.S. PATENT DOCUMENTS

| | | | |
|---|---|---|---|
| 8,886,392 B1* | 11/2014 | Maeng | G06Q 10/20 701/29.4 |
| 2005/0003844 A1* | 1/2005 | Nishiga | H04W 4/029 455/517 |
| 2009/0189373 A1* | 7/2009 | Schramm | B60R 11/0264 280/731 |
| 2016/0280040 A1* | 9/2016 | Connell | G07C 5/008 |
| 2018/0005525 A1* | 1/2018 | Parundekar | H04L 67/12 |

* cited by examiner

*Primary Examiner* — John F Mortell
(74) *Attorney, Agent, or Firm* — Brandon Hicks; Eversheds Sutherland (US) LLP

(57) ABSTRACT

Techniques and implementations pertaining to information sharing and user experience enhancement by networked vehicles are described. A method may involve receiving contextual data regarding each of one or more user contexts associated with a first vehicle of a community of vehicles from the first vehicle. The method may also involve determining that a second vehicle of the community of vehicles is in a first user context which matches one of the one or more user contexts associated with the first vehicle. The method may further involve transmitting information regarding the first user context to the second vehicle. A vehicle may determine that the vehicle will be in a user context similar or identical to at least one of one or more previous user contexts, and execute one or more actions pertaining to the user context.

9 Claims, 4 Drawing Sheets

INFORMATION SHARING AND USER EXPERIENCE ENHANCEMENT BY CONTEXT-AWARE VEHICLES

TECHNICAL FIELD

The present disclosure generally relates to vehicle-to-vehicle communication and, more particularly, to networked vehicles that are context aware and capable of sharing information on contextual data with other networked vehicles as well as enhancing user experience for users of such vehicles.

BACKGROUND

Vehicular communication systems are networks in which automobiles and roadside units constitute communicating nodes to provide each other with information such as safety warnings and traffic information. For example, vehicle-to-vehicle (V2V) is an automobile technology designed to allow automobiles (herein interchangeably referred to as "vehicles") to communicate with each other. However, presently there is no mechanism for a vehicle to communicate with other vehicles to share information on contextual data related to a user of the vehicle. Moreover, presently there is no mechanism for a vehicle to communicate with other vehicles to share information about vehicle health data or location-based information.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
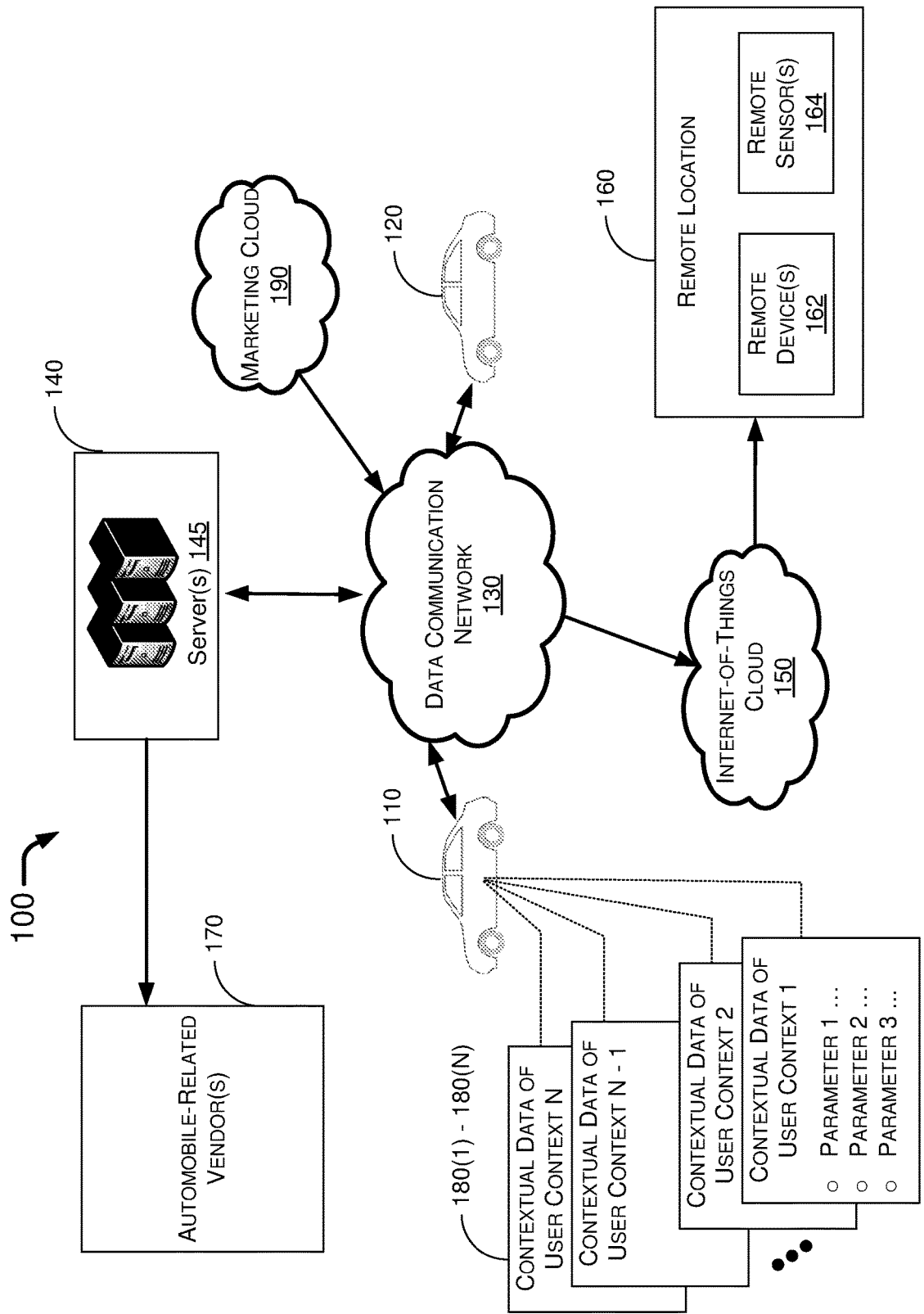
FIG. 1 is a diagram depicting an example community of vehicles in which embodiments in accordance with the present disclosure may be utilized.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

The present disclosure provides a system that allows vehicles to share information on contextual data with one another. The shared information may include, for example and not limited to, natural disasters (e.g., flood, fire, earthquake, tornado and the like), unexpected events (e.g., strike, terrorist attack, curfew and the like), unexpected road conditions (e.g., road repair, car accident, loose object on the road and the like), points of interest, vehicle health data shared with vehicles of similar or identical model, and so on. When vehicles communicate with each other to share information, the vehicles may be able to enhance user experience for users (e.g., drivers and/or occupants) of the vehicles. Using the shared information received from other vehicle(s), a vehicle may perform various operations such as, for example and not limited to, re-routing a current travel to avoid a natural disaster or an unexpected road condition, identifying likely point(s) of interest along a given route with respect to a user of the vehicle (e.g., the driver), and generating maintenance and/or service notifications based on vehicle health data from vehicle(s) of similar or identical models.

The system may monitor a current user context and maintain a record of contextual data including parameters of one or more user contexts pertaining to vehicles, and may trigger, activate or otherwise actuate various events and/or functions based on a result of the monitoring. In the present disclosure, a user context may refer to a circumstance or situation in which a vehicle is in/is experiencing or has been in/has experienced. A user context may be related to, for example and not limited to, a location of a vehicle, a trip or travel taken by or is undertaken by a vehicle, frequent stops made by a vehicle along a route, user preferences such as one or more settings (e.g., temperature, radio station setting, speaker volume and so on) regarding environmental comfort in a passenger cabin of a vehicle, a weather condition at or near a particular location traveled by a vehicle, a driving pattern experienced by a vehicle, a history of part repair and/or replacement associated with a vehicle and a maintenance schedule of a vehicle.

Advantageously, when a vehicle is aware of a current user context, the vehicle may be able to carry out actions to enhance user experience. For instance, the vehicle may wirelessly trigger a remote event or function for the benefit of an occupant of the vehicle. Moreover, with respect to the current user context, the vehicle may provide suggestions to the occupant based on the record of contextual data regarding past user context similar or identical to the current user context. Also advantageously, the contextual data may allow a vehicle manufacturer to monitor the performance and reliability of one or more vehicle models under different driving patterns (e.g., highway driving and city driving) and in different driving environments (e.g., cold, wet, hot and dry climates).

FIG. 1 illustrates an example community 100 of context-aware vehicles in which embodiments in accordance with the present disclosure may be utilized. Community 100 may include multiple context-aware vehicles such as vehicle 110 and vehicle 120. Vehicle 110 and vehicle 120 may be wirelessly connected to one another directly or indirectly via one or more other context-aware vehicles in community 100 and/or infrastructure for wireless communication. For simplicity, a data communication network 130 is shown in FIG. 1 to represent such one or more other vehicles and/or infrastructure for wireless communication. That is, vehicle 110 and vehicle 120 may wirelessly communicate to one another directly and/or indirectly via data communication network 130. Community 100 may further include a data center 140 which may include one or more servers 145 in which various embodiments and techniques pertaining to the facilitation of information sharing among vehicles of community 100 may be implemented. Although illustrated as a single data center, data center 140 may be a single data center at a physical location or, alternatively, data center 140 may include multiple physical data centers dispersed across a wide geographical region.

Prior to being a part of community 100, a vehicle may, under the control of a user (e.g., driver) thereof, transmit a request to join community 100. The request may be received by any vehicle or infrastructure of community 100 and may be forwarded to the one or more servers 145 of data center 140. The request may be sent by the user of the requesting vehicle based on a user name and/or identification associated with the user of the requesting vehicle. In cases where a given user owns or otherwise operates multiple vehicles, such user may select one, some or all of the multiple vehicles to join community 100. Upon receiving the request, the one or more servers 145 may forward the request to each vehicle of community 100 which may in turn, under the control a respective user thereof, transmit a reply that accepts or rejects the request. That is, a vehicle in community 100 may directly receive a request to join community 100 from a vehicle not yet in community 100. Alternatively or additionally, a vehicle in community 100 may receive such a request from the one or more servers 145. A user of a vehicle already in community 100 may accept the request from a requesting vehicle by making a user input (e.g., via a user input mechanism of the vehicle or via a mobile app on a portable device) to accept the request, and the acceptance may be transmitted to the one or more servers 145. Upon receiving acceptance from some or all of the vehicles of community 100, the one or more servers 145 may transmit a message to the requesting vehicle to indicate that it has been accepted to join community 100. Once accepted by users of vehicles of community 100, the requesting vehicle may join community 100.

In various embodiments in accordance with the present disclosure, each vehicle in community 100 may be aware of a current user context pertaining to one or more users thereof (e.g., driver and/or passenger(s) of the vehicle). Specifically, each vehicle in community 100 may monitor a current user context and store, update or otherwise maintain a record of contextual data including one or more parameters of the current user context in which the vehicle is in and one or more previous user contexts in which the vehicle has been. For illustrative purpose without limiting the scope of the present disclosure, FIG. 1 shows vehicle 110 maintaining a record of contextual data of a number of user contexts 180(1)-180(N), with N being a positive integer greater than or equal to 1. The contextual data of a given user context may include data or information on a number of parameters and/or a number of user entries. Each vehicle in community 100 may "publish" the contextual data it maintains by transmitting the context data to the one or more servers 145 of data center 140. The one or more servers 145 may store the contextual data of various user contexts received from vehicles of community 100 and "push" the contextual data to vehicles of community 100. That is, the one or more servers 145 may transmit some or all of the received contextual data to one, some or all of the vehicles of community 100.

In some embodiments, the one or more servers 145 may determine that a vehicle of the community 100 (e.g., vehicle 110 or vehicle 120) may be in a certain user context which matches one of the user contexts the contextual data of which is maintained by the one or more servers 145. Accordingly, the one or more servers 145 may transmit information regarding the certain user context to such vehicle. That is, the one or more servers 145 may determine what user context a given vehicle (e.g., vehicle 110 or vehicle 120) may be in and transmit to the vehicle contextual data regarding a corresponding user context that is similar or identical to the user context that the vehicle is currently in. For example, vehicle 110 may be in San Francisco and vehicle 120 may be in London, and the one or more servers 145 may determine the respective location of each of vehicle 110 and vehicle 120 based on the contextual data received from vehicle 110 and vehicle 120 indicating the location being San Francisco and London, respectively. In this example, the one or more servers 145 may transmit contextual data (e.g., road conditions) related to San Francisco to vehicle 110 but not to vehicle 120. Likewise, the one or more servers 145 may transmit contextual data (e.g., weather) related to London to vehicle 120 but not to vehicle 110.

In some embodiments, the one or more servers 145 may transmit contextual data commonly pertaining to multiple vehicles of community 100 to such multiple vehicles. For example, the one or more servers 145 may transmit information related to a particular model, a particular year or make and/or a particular vehicle manufacturer to those vehicles of community 100 sharing the same model, year or make and/or vehicle manufacturer. Such information may be, for example and not limited to, vehicle health data, vehicle maintenance notification(s), history of parts repair/replacement, maintenance schedule, recall(s) by a vehicle manufacturer, safety warning(s) about part(s) of a given model and so on.

In some embodiments, community 100 may also include an Internet-of-things (IoT) community or cloud 150. IoT cloud 150 may include one or more wirelessly-connected devices and/or sensors in wireless communication with one or more vehicles and/or one or more infrastructure components of data communication network 130. Through IoT cloud 150, a vehicle (e.g., vehicle 110 and/or vehicle 120) may communicate with one or more devices 162 and/or sensors 164 at a remote location 160, which may be, for example and not limited to, a home or office of a user of the vehicle.

Being context aware, each vehicle of community 100 may determine that the vehicle will be in a first user context similar or identical to at least one of one or more user contexts in which the vehicle has been. Accordingly, the context-aware vehicle may execute one or more actions pertaining to the first user context. For example, the first user context may include or otherwise indicate frequent stops at one or more points of interest over a plurality of trips made by the vehicle. Thus, the vehicle may determine a route between a current location of the vehicle and at least one of the one or more points of interest. Moreover, the vehicle may provide information on the route in one or more human-perceivable manners (e.g., auditory, visual, or both auditory and visual). For example, when a user (e.g., driver) of vehicle 110 is a coffee lover and makes frequent visits to one or more coffee shops along a route between the home and the office of the user, vehicle 110 may maintain the route and the frequent stops (e.g., location(s) and/or name(s) of the coffee shop(s)) as contextual data of a corresponding user context. The contextual data of this user context, after being published by vehicle 110, may be transmitted by the one or more servers 145 to one or more vehicles of community 100 each traveling along the same or similar route. Thus, when vehicle 120 travels along the same or similar route, vehicle 120 may receive such contextual data and display or otherwise provide information on the coffee shop(s) along the route to the user of vehicle 120.

In some embodiments, in executing the one or more actions pertaining to the first user context, the vehicle may determine a first time at which a condition related to the first user context at a remote location (e.g., remote location 160) is to be met, and then wirelessly activate, at a second time and through IoT cloud 150, a remote device at the remote location such that the condition is met no later than the first time. For example, the first user context may be an ambient environment in a passenger cabin of the vehicle, at least one parameter of the first user context may be a temperature of the ambient environment, and the remote device may be a heating, ventilating and air conditioning (HVAC) device (e.g., air conditioner, space heater or the like) configured to control environmental comfort of the remote location. Furthermore, in determining the first time at which the condition related to the first user context at the remote location is to be met, the vehicle may determine at least one parameter of a second user context pertaining to the vehicle. The vehicle may also determine the first time based at least in part on the at least one parameter of the second user context, which may be a location of the vehicle. In this example, the at least one parameter of the second user context may include one or more of a speed of the vehicle, a length of a route between the location of the vehicle and the remote location, and a road condition of the route between the location of the vehicle and the remote location. Thus, the vehicle may identify user preferences of a user of the vehicle, as a user context, and control one or more remote items/devices based on the user preferences. In this example, the vehicle may identify a user preference of an ambient temperature to be 70° F. When the vehicle is traveling to a destination (e.g., the home or office of the user) which is remote from the vehicle, the vehicle may wirelessly communicate with a device of a HVAC device at the destination to adjust the temperature of the destination so that the temperature at the destination can reach 70° F. no later than an estimated time at which the vehicle (and hence the user) arrives at the destination.

In some embodiments, the one or more servers 145 may provide some or all of the contextual data of user contexts received from vehicles of community 100 to one or more automobile-related vendors 170. The one or more automobile-related vendors 170 may include, for example and not limited to, vehicle manufacturers, vehicle dealerships and vehicle repair shops. With respect to vehicle manufacturers, contextual data related to vehicle health data, maintenance schedules and/or road trips may be beneficial as such contextual data may allow the manufacturer to monitor the performance and reliability of one or more vehicle models under different driving patterns (e.g., highway driving and city driving) and in different driving environments (e.g., cold, wet, hot and dry climates).

In some embodiments, one or more commercial entities and/or marketing entities may be connected to data communication network 130 via a marketing-related network or marketing cloud 190. Through marketing cloud 190, a commercial entity or marketing entity may publish data on advertisements, suggestions and/or information related to some or all of the vehicles of community 100. Such data may be categorized into various contexts and, thus, each vehicle of community 100 may display or otherwise provide to its user the data received from marketing cloud 190 when the context associated with the data matches a current user context which the vehicle is in.

Figure 2:
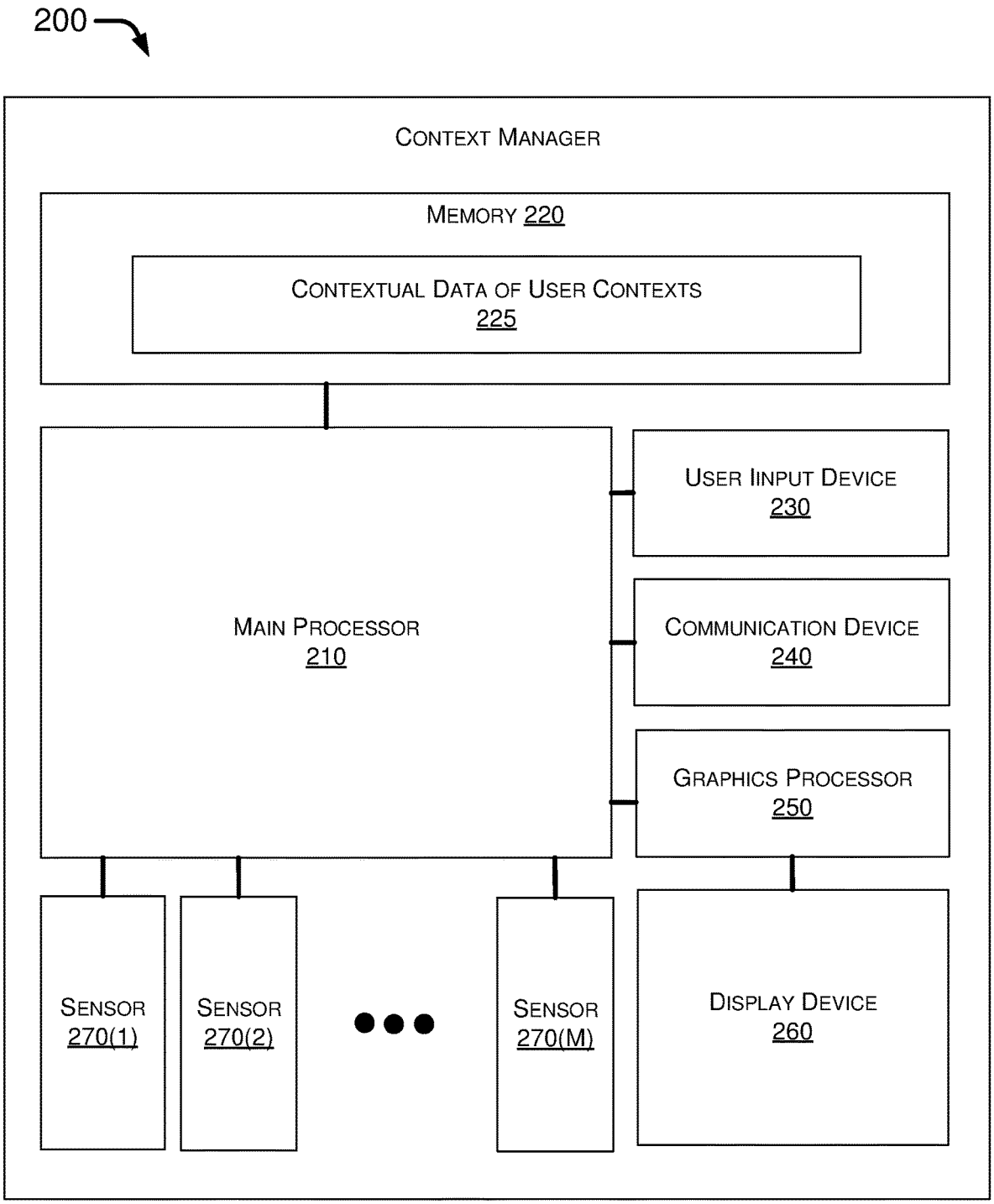
FIG. 2 is a simplified block diagram depicting an example apparatus in accordance with an embodiment of the present disclosure.

FIG. 2 illustrates an example apparatus, or context manager 200, in accordance with an embodiment of the present disclosure. Context manager 200 may perform various functions related to techniques, methods and systems described herein, including those described above with respect to vehicle 110 and vehicle 120 as well as those described below with respect to process 300 and process 400. Context manager 200 may be installed, equipped or otherwise implemented in vehicle 110 and vehicle 120 to effect various embodiments in accordance with the present disclosure. Context manager 200 may include at least some of the components illustrated in FIG. 2.

Context manager 200 may include one or more sensors 270(1)-270(M), where M is a positive integer greater than or equal to 1. The one or more sensors 270(1)-270(M) may be configured to detect one or more parameters of one or more user contexts associated with the vehicle (e.g., vehicle 110 and/or vehicle 120). For instance, the one or more sensors 270(1)-270(M) may detect an actual temperature in a passenger cabin of the vehicle, a temperature set by a user of the vehicle at a control console or dashboard of the vehicle, a frequency of a radio station chosen by the user, a volume setting for speakers of the vehicle set by the user and a geographic location of the vehicle (e.g., global positioning system (GPS) coordinates).

Context manager 200 may include a user input device 230 configured to receive one or more user inputs from a user of the vehicle. User input device 230 may include one or more features to allow the user to enter user input(s) in one or more manners. The one or more features may include, for example and not limited to, one or more touch-sensing panels, one or more buttons, one or more turn knobs, and one or more microphones with accompanying logics to recognize human speech by the user. With user input device 230, a user may make user input(s) to denote one or more user contexts such as, for example and not limited to, natural disasters (e.g., flood, fire, earthquake, tornado and the like), unexpected events (e.g., strike, terrorist attack, curfew and the like), unexpected road conditions (e.g., road repair, car accident, loose object on the road and the like), points of interest, vehicle health data and so on.

Context manager 200 may include a communication device 240 configured to wirelessly transmit and receive data.

Context manager 200 may further include one or more processors, such as a main processor 210, coupled to receive data on the one or more parameters from the one or more sensors 270(1)-270(M) and to receive the one or more user inputs from the user input device 230. Main processor 210 may maintain a record of the one or more parameters and the one or more user inputs as contextual data 225 of the one or more user contexts. Main processor 210 may also determine that the vehicle (e.g., vehicle 110) will be in a first user context similar or identical to at least one of the one or more user contexts. Main processor 210 may further execute one or more actions pertaining to the first user context.

Context manager 200 may also include a memory device 220 coupled to main processor 210. Memory device 220 may be configured to store data, firmware and software programs therein. For example, memory device 220 may store contextual data 225 of the one or more user contexts.

In some embodiments, in executing the one or more actions pertaining to the first user context, main processor 210 may determine a first time at which a condition related to the first user context at a remote location (e.g., home or office of the user) is to be met. Moreover, main processor 210 may wirelessly activate, at a second time, a remote device at the remote location such that the condition is met no later than the first time. The first user context may include, for example, an ambient environment in a passenger cabin of the vehicle. The at least one parameter of the first user context may include a temperature of the ambient environment. The remote device may include a HVAC device configured to control environmental comfort of the remote location.

In some embodiments, in determining the first time at which the condition related to the first user context at the remote location is to be met, main processor 210 may determine at least one parameter of a second user context pertaining to the vehicle. Additionally, main processor 210 may determine the first time based at least in part on the at least one parameter of the second user context. The second user context may include a location of the vehicle. The at least one parameter of the second user context may include one or more of a speed of the vehicle, a length of a route between the location of the vehicle and the remote location, and a road condition of the route between the location of the vehicle and the remote location.

In some embodiments, the one or more processors of context manager 200 may also include a graphics processor 250 coupled to main processor 210. Additionally, context manager 200 may include a display device 260 coupled to graphics processor 250. Display device 260 may receive data to be displayed from graphics processor 250. In some embodiments, the first user context may include frequent stops at one or more points of interest over a plurality of trips. Accordingly, in executing the one or more actions pertaining to the first user context, main processor 210 may determine a route between a current location of the vehicle and at least one of the one or more points of interest. Moreover, main processor 210 may provide information on the route in one or more human-perceivable manners. For example, main processor 210 may cause graphics processor 250 to control display device 260 to display the route and the information on the route.

In some embodiments, main processor 210 may be configured to perform additional operations. For instance, main processor 210 may transmit (e.g., via communication device 240) a request to form or join a community of vehicles (e.g., community 100) with at least one other vehicle. Main processor 210 may transmit (e.g., via communication device 240) contextual data regarding each of the one or more user contexts associated with the vehicle. Main processor 210 may also receive information on the first user context or a second user context of the one or more user contexts associated with another vehicle of the community of vehicles (e.g., vehicle 120).

Additionally or alternatively, main processor 210 may be configured to perform further operations. For instance, main processor 210 may receive information on a second user context of the one or more user contexts associated with one or more other vehicles of the community of vehicles. Main processor 210 may also execute one or more actions including, for example and not limited to, re-routing a current travel to avoid a natural disaster or a road condition, identifying one or more points of interest along a route of the current travel, and generating one or more maintenance notifications based on vehicle health data from at least one vehicle of the one or more other vehicles sharing a same model with the vehicle.

Figure 3:
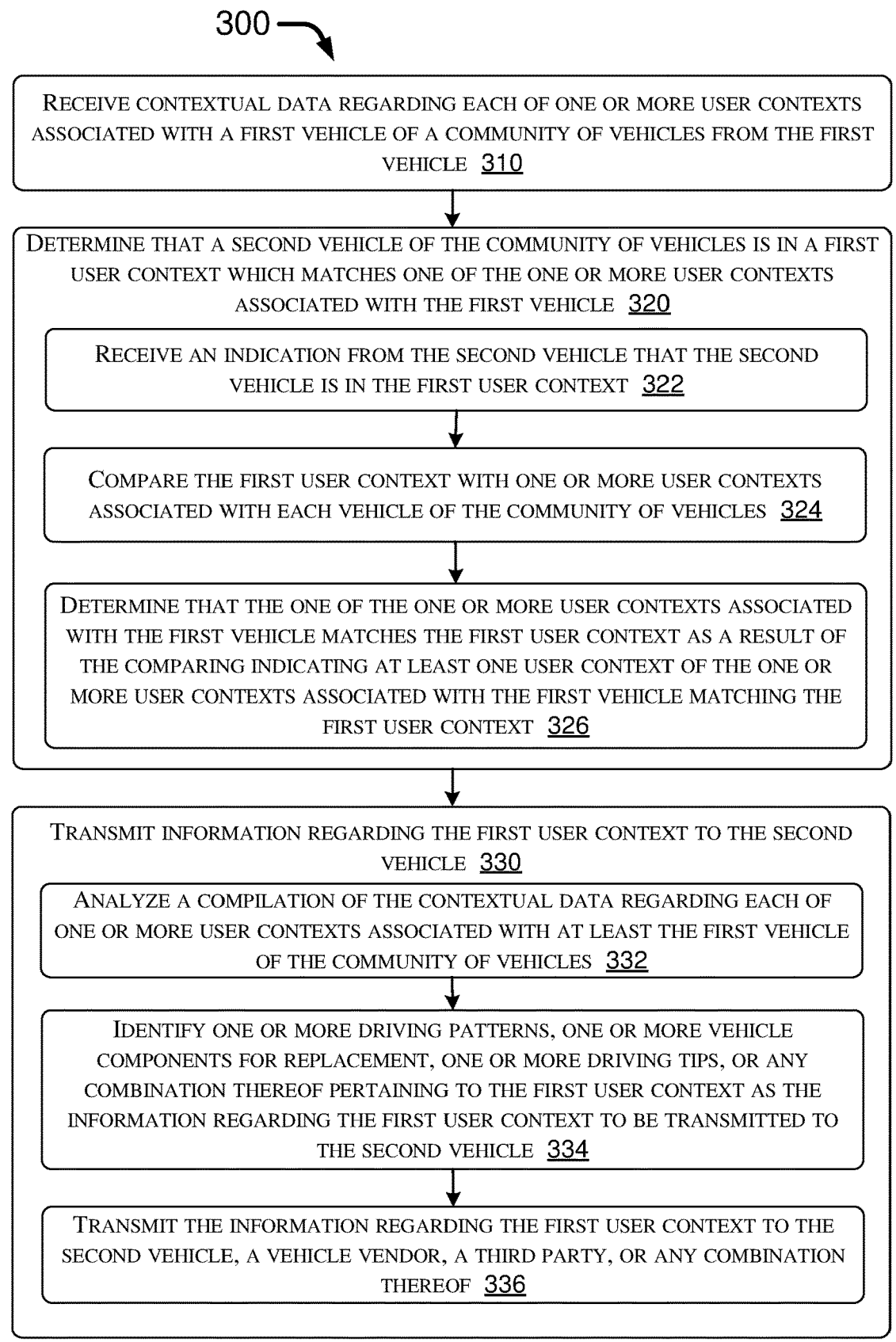
FIG. 3 is a flowchart depicting an example process in accordance with an embodiment of the present disclosure.

FIG. 3 illustrates an example process 300 for information sharing and user experience enhancement for context-aware vehicles in accordance with the present disclosure. Process 300 may include one or more operations, actions, or functions shown as blocks such as 310, 320 and 330 as well as sub-blocks 322, 324, 326, 332, 334 and 336. Although illustrated as discrete blocks, various blocks of process 300 may be divided into additional blocks, combined into fewer blocks, or eliminated, depending on the desired implementation. Process 300 may be implemented by vehicle 110, vehicle 120 and context manager 200. For illustrative purpose without limiting the scope of process 300, the following description of process 300 is provided in the context of the one or more servers 145 of data center 140. Process 300 may begin with block 310.

At 310, process 300 may involve the one or more servers 145 receiving contextual data regarding each of one or more user contexts associated with vehicle 110 of a community 100 of vehicles from vehicle 110. Process 300 may proceed from 310 to 320.

At 320, process 300 may involve the one or more servers 145 determining that vehicle 120 of the community 100 of vehicles is in a first user context which matches one of the one or more user contexts associated with vehicle 120. In some embodiments, in determining that vehicle 120 is in the first user context which matches one of the one or more user contexts associated with vehicle 110, process 300 may involve the one or more servers 145 performing a number of operations, as shown in sub-blocks 322, 324 and 326. At 322, process 300 may involve the one or more servers 145 receiving an indication from vehicle 120 that vehicle 120 is in the first user context. At 324, process 300 may involve the one or more servers 145 comparing the first user context with one or more user contexts associated with each vehicle of the community 100 of vehicles. At 326, process 300 may involve the one or more servers 145 determining that the one of the one or more user contexts associated with vehicle 110 matches the first user context as a result of the comparing indicating at least one user context of the one or more user contexts associated with vehicle 110 matching the first user context. Process 300 may proceed from 320 to 330.

At 330, process 300 may involve the one or more servers 145 transmitting information regarding the first user context to vehicle 120. In some embodiments, in transmitting the information regarding the first user context to vehicle 120, process 300 may involve the one or more servers 145 performing a number of operations, as shown in sub-blocks 332, 334 and 336. At 332, process 300 may involve the one or more servers 145 analyzing a compilation of the contextual data regarding each of one or more user contexts associated with at least vehicle 110 of the community 100 of vehicles. At 334, based on the analyzing, process 300 may involve the one or more servers 145 identifying one or more driving patterns, one or more vehicle components for replacement, one or more driving tips, or any combination thereof pertaining to the first user context as the information regarding the first user context to be transmitted to vehicle 120. At 336, process 300 may involve the one or more servers 145 transmitting the information regarding the first user context to vehicle 120, a vehicle vendor, a third party, or any combination thereof.

In some embodiments, the one or more user contexts associated with vehicle 110 may include one or more geographic locations traveled by vehicle 110. Moreover, the contextual data may include information on one or more natural disasters, one or more road conditions, one or more traffic conditions, or one or more points of interest associated with the one or more geographic locations. In some embodiments, the information transmitted to vehicle 120 may include a warning about the one or more natural disasters, a warning about the one or more road conditions, a warning about the one or more traffic conditions, information on one or more alternatively routes, information on the one or more points of interest, or any combination thereof.

In some embodiments, the first user context may include a route previously traveled by vehicle 110 and to be traveled by vehicle 120, an origin of a first trip previously made by vehicle 110 and to be made by vehicle 120, a destination of the first trip or a second trip previously made by vehicle 110 and to be made by vehicle 120, a mileage previously traveled by vehicle 110 and to be traveled by vehicle 120, or any combination thereof. Accordingly, in transmitting the information regarding the first user context to vehicle 120, process 300 may involve the one or more servers 145 generating one or more trip reports as the information regarding the first user context to be transmitted to vehicle 120. Moreover, process 300 may involve the one or more servers 145 transmitting the information regarding the first user context to vehicle 120, a vehicle vendor, a third party, or any combination thereof.

In some embodiments, the contextual data regarding each of one or more user contexts associated with at least vehicle 110 of the community 100 of vehicles may include vehicle health data regarding multiple vehicles of the community 100 of vehicles. Accordingly, in transmitting the information regarding the first user context to vehicle 120, process 300 may involve the one or more servers 145 performing a number of operations. For instance, the one or more servers 145 may compare the vehicle health data regarding at least some of the multiple vehicles of the community 100 of vehicles that share a same model, a same year of make, a same vehicle manufacturer, or any combination thereof. Based on the comparing, the one or more servers 145 may determine a suggestion on maintenance for vehicle 120 as the information regarding the first user context to be transmitted to vehicle 120. The one or more servers 145 may also transmit the information regarding the first user context to vehicle 120, a vehicle vendor, a third party, or any combination thereof.

In some embodiments, the information regarding the first user context to be transmitted to vehicle 120 may include information on a plurality of items. Accordingly, in transmitting the information regarding the first user context to vehicle 120, process 300 may involve the one or more servers 145 ranking the plurality of items according to at least one factor. Moreover, process 300 may involve the one or more servers 145 transmitting the information on the plurality of items to vehicle 120 such that information on a highest-rank item of the plurality of items is displayed by vehicle 120 before information on any other item of the plurality of items is displayed by vehicle 120.

Figure 4:
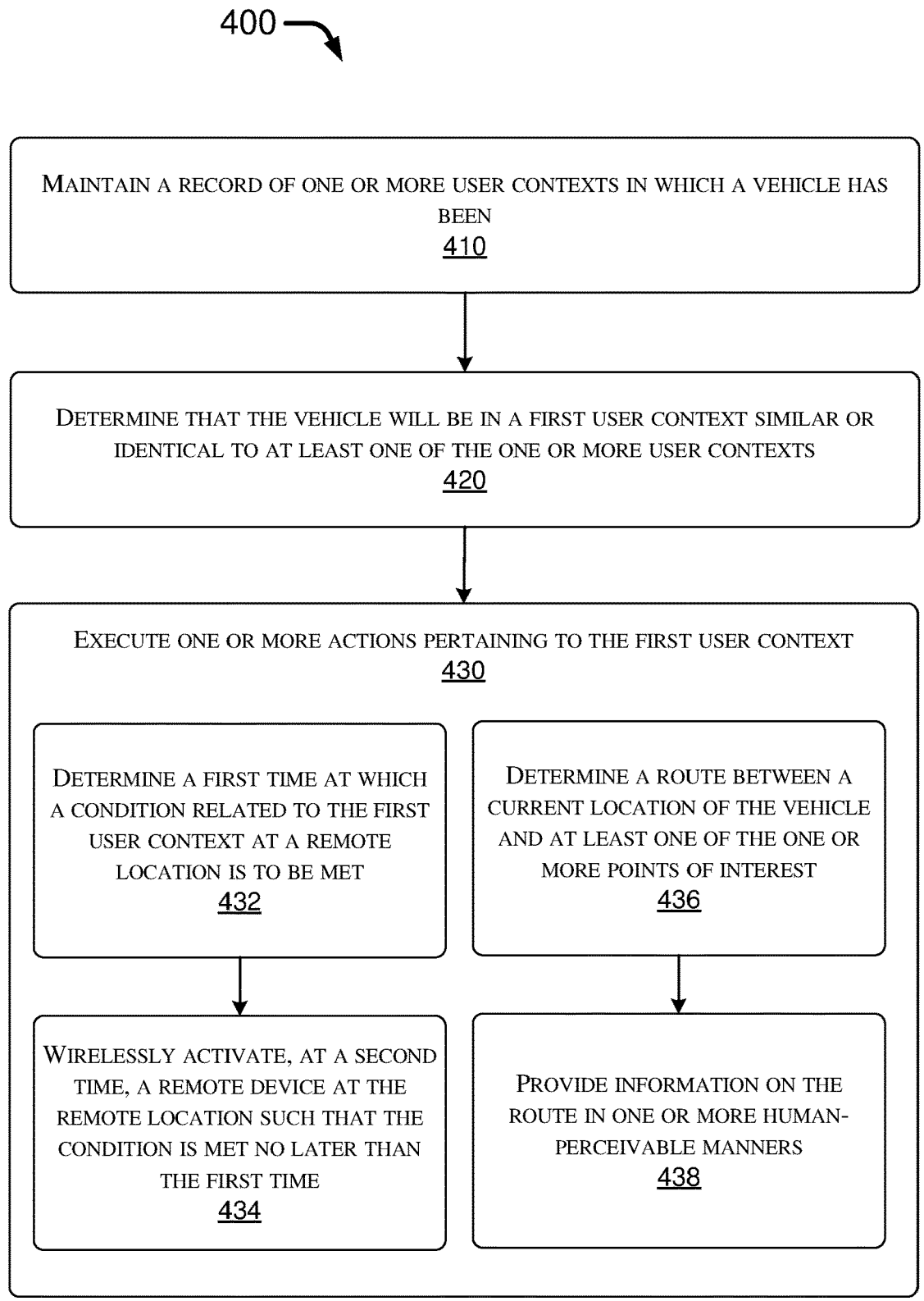
FIG. 4 is a flowchart depicting an example process in accordance with another embodiment of the present disclosure.

FIG. 4 illustrates an example process 400 for information sharing and user experience enhancement for context-aware vehicles in accordance with the present disclosure. Process 400 may include one or more operations, actions, or functions shown as blocks such as 410, 420 and 430 as well as sub-blocks 432, 434, 436 and 438. Although illustrated as discrete blocks, various blocks of process 400 may be divided into additional blocks, combined into fewer blocks, or eliminated, depending on the desired implementation. Process 400 may be implemented by vehicle 110, vehicle 120 and context manager 200. For illustrative purpose without limiting the scope of process 400, the following description of process 400 is provided in the context of vehicle 110. Process 400 may begin with block 410.

At 410, process 400 may involve vehicle 110 maintaining a record of one or more user contexts in which a vehicle has been. Process 400 may proceed from 410 to 420.

At 420, process 400 may involve vehicle 110 determining that the vehicle will be in a first user context similar or identical to at least one of the one or more user contexts. Process 400 may proceed from 420 to 430.

At 430, process 400 may involve vehicle 110 executing one or more actions pertaining to the first user context. In some embodiments, in executing the one or more actions pertaining to the first user context, process 400 may involve vehicle 110 performing a number of operations, as shown in sub-blocks 432 and 434. At 432, process 400 may involve the one or more servers 145 determining a first time at which a condition related to the first user context at a remote location is to be met. At 434, process 400 may involve vehicle 110 wirelessly activating, at a second time, a remote device at the remote location such that the condition is met no later than the first time. In some embodiments, the first user context may include an ambient environment in a passenger cabin of the vehicle. Accordingly, at least one parameter of the first user context may include a temperature of the ambient environment, and the remote device may include a HVAC device configured to control environmental comfort of the remote location. In some embodiments, the first user context may include frequent stops at one or more points of interest over a plurality of trips. Accordingly, in executing the one or more actions pertaining to the first user context, process 400 may involve vehicle 110 performing a number of other operations, as shown in sub-blocks 436 and 438. At 436, process 400 may involve the one or more servers 145 determining a route between a current location of the vehicle and at least one of the one or more points of interest. At 438, process 400 may involve vehicle 110 providing information on the route in one or more human-perceivable manners.

In some embodiments, in determining the first time at which the condition related to the first user context at the remote location is to be met, process 400 may involve vehicle 110 determining at least one parameter of a second user context pertaining to the vehicle. Moreover, process 400 may involve vehicle 110 determining the first time based at least in part on the at least one parameter of the second user context. The second user context may include a location of the vehicle. The at least one parameter of the second user context may include one or more of a speed of the vehicle, a length of a route between the location of the vehicle and the remote location, and a road condition of the route between the location of the vehicle and the remote location.

In the above disclosure, reference has been made to the accompanying drawings, which form a part hereof, and in which is shown by way of illustration specific implementations in which the present disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure.

What is claimed is:

1. A method, comprising:
   maintaining a record of a first user context in which a first vehicle has been, wherein the first user context comprises an ambient environment in a passenger cabin of the first vehicle;
   determining that a second vehicle will be in the first user context; and
   determining a first time at which a condition related to the first user context at a remote location is to be met; and
   wirelessly activating, at a second time, a remote device at the remote location such that the condition is met no later than the first time,
   wherein at least one parameter of the first user context comprises a temperature of the ambient environment, and wherein the remote device comprises a heating, ventilating and air conditioning (HVAC) device configured to control environmental comfort of the remote location.

2. The method of claim 1, wherein the determining of the first time at which the condition related to the first user context at the remote location is to be met comprises:
   determining a parameter of a second user context pertaining to the vehicle; and
   determining the first time based at least in part on the parameter of the second user context,
   wherein the second user context comprises a location of the vehicle, and
   wherein the parameter of the second user context comprises at least one of: a speed of the vehicle; a length of a route between the location of the vehicle and the remote location; and a road condition of the route between the location of the vehicle and the remote location.

3. The method of claim 1, wherein the first user context comprises frequent stops at one or more points of interest over a plurality of trips, and wherein the method further comprises:
   determining, based on an existence of the frequent stops in the first user context, a route between a current location of the vehicle and at least one of the one or more points of interest; and
   providing information on the route in one or more human-perceivable manners.

4. An apparatus implementable in a vehicle, comprising:
   a sensor configured to detect a parameter of a first user context associated with the vehicle, wherein the first user context comprises an ambient environment in a passenger cabin of the vehicle; and
   a processor configured to perform operations comprising:
      determining a first time at which a condition related to the first user context at a remote location is to be met; and
      wirelessly activating, at a second time, a remote device at the remote location such that the condition is met no later than the first time,
      wherein at least one parameter of the first user context comprises a temperature of the ambient environment, and wherein the remote device comprises a heating, ventilating and air conditioning (HVAC) device configured to control environmental comfort of the remote location.

5. The apparatus of claim 4, wherein the processor is configured to perform operations comprising:
   determining a first time at which a condition related to the first user context at a remote location is to be met; and
   wirelessly activating, at a second time, a remote device at the remote location such that the condition is met no later than the first time,
   wherein the user context comprises an ambient environment in a passenger cabin of the vehicle,
   wherein the parameter of the first user context comprises a temperature of the ambient environment, and
   wherein the remote device comprises a heating, ventilating and air conditioning (HVAC) device configured to control environmental comfort of the remote location.

6. The apparatus of claim 5, wherein, in determining the first time at which the condition related to the first user context at the remote location is to be met, the processor is configured to perform operations comprising:
   determining a parameter of a second user context pertaining to the vehicle; and
   determining the first time based at least in part on the parameter of the second user context,
   wherein the second user context comprises a location of the vehicle, and
   wherein the parameter of the second user context comprises at least one of: a speed of the vehicle; a length of a route between the location of the vehicle and the remote location; and a road condition of the route between the location of the vehicle and the remote location.

7. The apparatus of claim 4, wherein the first user context comprises frequent stops at points of interest over a plurality of trips, and wherein the processor is configured to perform operations comprising:
   determining, based on an existence of the frequent stops in the first user context, a route between a current location of the vehicle and at least one of the one or more points of interest; and
   providing information on the route in one or more human-perceivable manners.

8. The apparatus of claim 4, wherein the processor is further configured to perform operations comprising:
   transmitting a request to form or join a community of vehicles;
   receiving a response indicating acceptance to the community of vehicles;
   transmitting, based on receiving the response indicating acceptance to the community of vehicles, contextual data regarding a user context associated with the vehicle; and
   receiving information about another user context associated with another vehicle of the community of vehicles.

9. The apparatus of claim 4, wherein the processor is further configured to perform operations comprising:
   receiving information on a second user context; and
   executing one or more actions comprising re-routing a current travel to avoid a natural disaster or a road condition, identifying one or more points of interest along a route of the current travel, and generating one or more maintenance notifications based on vehicle health data from at least one vehicle of the one or more other vehicles sharing a same model with the vehicle.

* * * * *